A. PUTNAM, Jr.
Wire-Fence.
No. 197,661. Patented Nov. 27, 1877.
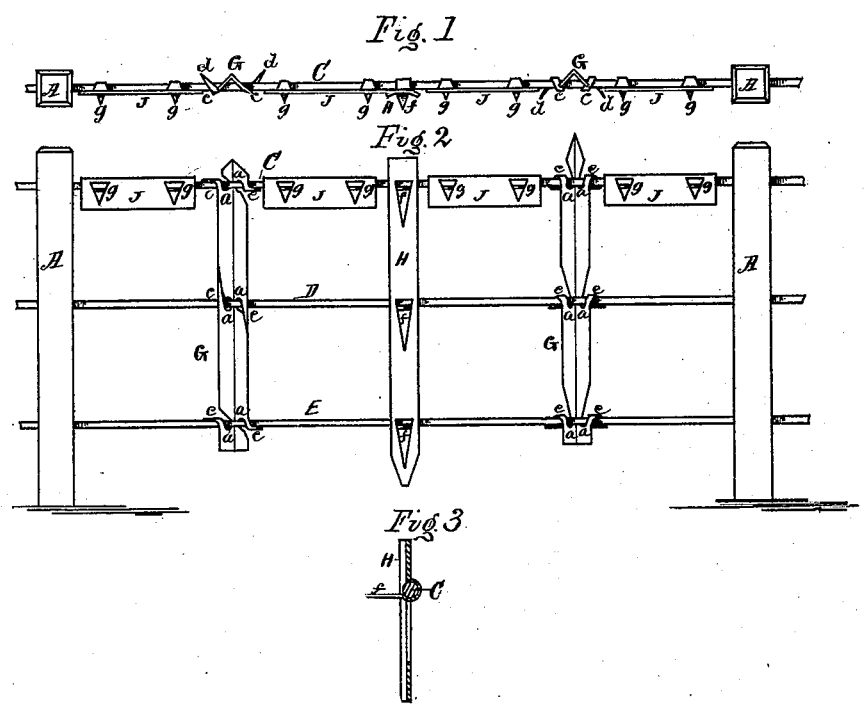
WITNESSES
INVENTOR

UNITED STATES PATENT OFFICE.

ABEL PUTNAM, JR., OF SARATOGA SPRINGS, NEW YORK.

IMPROVEMENT IN WIRE FENCES.

Specification forming part of Letters Patent No. 197,661, dated November 27, 1877; application filed July 14, 1877.

*To all whom it may concern:*

Be it known that I, ABEL PUTNAM, Jr., of Saratoga Springs, in the county of Saratoga and State of New York, have invented certain new and useful Improvements in Wire Fences; and I do hereby declare the following to be a full, clear, and exact description thereof, which will enable others skilled in the art to which my invention appertains to make and use the same, reference being had to the accompanying drawing, forming part of this specification, in which—

Figure 1 represents a general plan or top view of one of the panels of a wire fence embodying my said invention. Fig. 2 represents a side elevation of the same; and Fig. 3 represents a sectional elevation of one of the stays, showing the manner of securing the same to the wires.

Like letters of reference indicate like parts.

My invention relates to that class of fences in which the several rails are formed of wire; and the object of my invention is to provide a means of supporting the wires between the posts, and so as to hold them at a uniform distance apart, and parallel with each other.

To that end my invention consists in the arrangement of parts, as is more fully set forth in the following description and claims.

In the drawing, A A represent the posts, which are made in any suitable shape, and set in the ground in the ordinary manner.

C, D, and E represent the rails, which are made of a single wire, or may be made of two or more wires twisted together, if preferred, and are secured to the posts A A in the ordinary manner. G G represent stays or pickets, which are formed of strips of sheet metal, bent at the center laterally, and so that their edges will be at an obtuse angle to each other, as shown in Fig. 1.

The sides of these stays are provided with a series of perforations, $a$, through which perforations the respective wires or rails C, D, and E pass, and are slit at the edge from a point above each perforation obliquely downward to the same, forming narrow sharp-pointed strips $c$, which are bent or coiled around the wires, and so as to project laterally therefrom, forming barbs or spurs $d$, as shown in Fig. 1.

H is a modified form of stay or picket, which is also formed of a strip of sheet metal, and is curved or bent at its center laterally, so that its edges are at an obtuse angle to each other.

This stay or picket is slit at its center laterally so as to form a series of sharp-pointed spurs, $f$, which are bent outward and over and around the respective wires or rails C, D, and E, and so that the pointed end will pass through the opening from which it is taken, and under the wire, and so as to project laterally therefrom, as shown in Fig. 3.

These spurs or barbs serve to connect the stays or pickets to the respective wires or rails, and so as to hold the said rails parallel with each other their entire length, and, at the same time, prevent cattle or horses from rubbing against them or attempting to pass through between the rails.

J represents a series of guards, which are made of any suitable sheet metal, and are fitted upon the upper rail, between the posts. These guards are slit at a point near each end so as to form sharp-pointed spurs $g$, which are bent over and around the rail, and so as to pass through the opening from which it is taken, and so as to project laterally from the wire. The object of these guards is to enable cattle or horses to see the wire, and thereby prevent them from running against it; and the object of providing the guards with the spurs $g$ is to prevent the cattle from rubbing against them.

It is readily seen that by connecting the wires together laterally by the stays or pickets, and so as to prevent the wires from being moved apart, the fence will be much stronger and more durable than would be the case if the wires have no connection other than the posts.

I sometimes use my improvement in constructing picket-fences, in which case I use only two wires, and place the stays or pickets at a distance of from two to three inches apart.

Having thus described my invention, what I claim as new, and desire to secure by Letters Patent, is—

1. The combination, with two or more wire fence-rails, C and E, of the stays or pickets G G, slit at the edges to form the strips $c$, said strips being bent around the wires to connect the stays thereto, and so as to project laterally from the wires to form the spurs or barbs $d$, substantially as and for the purpose specified.

2. The combination, with the wire C, of the guard J, provided with the spurs or barbs $g\ g$, and connected to the wire by coiling the spurs around the wire, substantially as and for the purpose specified.

ABEL PUTNAM, JR.

Witnesses:
N. H. SHERBURNE,
G. R. HOFFMAN.